United States Patent [19]

Jahnke

[11] 3,864,311
[45] Feb. 4, 1975

[54] COMPOSITIONS PREPARED BY THE REACTION OF AMINES WITH HYDROXYALKYLATED AND ALKOXYALKYLATED DERIVATIVES OF N-3-OXOHYDROCARBON-SUBSTITUTED ACRYLAMIDES

[75] Inventor: Richard William Jahnke, Mentor-on-the-Lake, Ohio

[73] Assignee: The Lubrizol Corporation, Wickliffe, Ohio

[22] Filed: June 5, 1972

[21] Appl. No.: 259,889

[52] U.S. Cl.............. 260/561 N, 260/64, 260/65, 260/72 R, 260/72.5, 260/89.7 N, 260/247.2 A, 260/326.3, 260/326.8, 260/293.88, 260/562 R
[51] Int. Cl........................................... C07c 103/30
[58] Field of Search.................... 260/561 N, 561 R

[56] References Cited
UNITED STATES PATENTS

| | | | |
|---|---|---|---|
| 2,272,783 | 2/1942 | Treboux | 260/561 R X |
| 3,454,669 | 7/1969 | Laudise | 260/830 R |
| 3,474,129 | 10/1969 | Kolb et al. | 260/561 N X |
| 3,518,326 | 6/1970 | Forsberg | 260/64 X |
| 3,651,140 | 3/1970 | Coleman | 260/561 N |

FOREIGN PATENTS OR APPLICATIONS

| | | |
|---|---|---|
| 413,345 | 7/1934 | Great Britain ................ 260/561 R |
| 1,250,987 | 10/1971 | Great Britain |

OTHER PUBLICATIONS

Noller, Chemistry of Organic Compounds, 3rd Edition, pp. 259, 260 & 275.

*Primary Examiner*—Lewis Gotts
*Assistant Examiner*—Ethel G. Love
*Attorney, Agent, or Firm*—J. Walter Adams, Jr.; William H. Pittman

[57] ABSTRACT

Novel compositions are prepared by the reaction of primary and secondary amines, especially mono- and di-(lower alkyl)amines and polyalkylene polyamines, with compositions formed by the reaction of lower aliphatic aldehydes (especially formaldehyde) with diacetone acrylamide and analogous compounds. The novel compositions are useful as epoxy curing agents.

27 Claims, No Drawings

COMPOSITIONS PREPARED BY THE REACTION OF AMINES WITH HYDROXYALKYLATED AND ALKOXYALKYLATED DERIVATIVES OF N-3-OXOHYDROCARBON-SUBSTITUTED ACRYLAMIDES

This invention relates to new compositions of matter and a method for their preparation. More particularly, it relates to compositions prepared by reacting (A) a primary and secondary amine with (B) a water-soluble composition as defined hereinafter.

Reagent A used in preparing the compositions of this invention, a primary or secondary amine, may be chosen from aliphatic, cycloaliphatic, aromatic (including aliphatic- and cycloaliphatic-substituted aromatic and aromatic-substituted aliphatic and cycloaliphatic) and heterocyclic amines, including polyamines. Thus, a reagent A may be, for example, ethylamine, diethylamine, n-butylamine, di-n-butylamine, isobutylamine, stearylamine, oleylamine, aniline, methylaniline, diphenylamine, benzylamine, toluylamine, pyrrole, pyrrolidine, piperidine, morpholine, ethylene, diamine, diethylene triamine, commercial mixtures of polyethylene polyamines containing 3–7 amino groups, and the like. Particularly preferred are mono- and di-(lower alkyl)amines, the term "lower" referring to radicals containing up to 7 carbon atoms, and polyalkylene polyamines, particularly polyethylene polyamines.

Reagent B is a water-soluble composition prepared by reacting, in the presence of an alkaline reagent, an aliphatic aldehyde containing not more than 4 carbon atoms, or a reversible polymer thereof, with an N-3-oxo-hydrocarbon-substituted acrylamide having the formula (I) 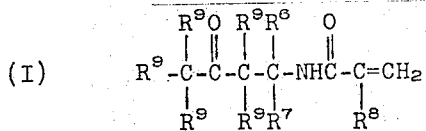

wherein each $R^9$ is individually hydrogen or a hydrocarbon or substituted hydrocarbon radical, at least one $R^9$ being hydrogen; each of $R^6$ and $R^7$ is hydrogen or a hydrocarbon or substituted hydrocarbon radical; and $R^8$ is hydrogen, halogen or a lower alkyl or substituted lower alkyl radical; said reaction being effected in a diluent comprising (1) water, or (2) an organic liquid which is a solvent for the reactants or the product or both, or (3) a mixture of diluents 1 and 2.

The term "hydrocarbon radical" as used herein includes aliphatic, cycloaliphatic and aromatic (including aliphatic- and cycloaliphatic-substituted aromatic and aromatic-substituted aliphatic and cycloaliphatic) radicals. It also includes cyclic radicals wherein the ring is completed through another portion of the molecule; that is, any two indicated substituents may together form a cycloalkyl radical.

The following are illustrative of hydrocarbon radicals within the scope of this invention. Where a named radical has several isomeric forms (e.g., butyl), all such forms are included.

| | |
|---|---|
| Methyl | Benzyl |
| Ethyl | Cyclohexyl |
| Propyl | Cyclopentyl |
| Butyl | Methylcyclopentyl |
| Hexyl | Cyclopentadienyl |
| Octyl | Vinylphenyl |
| Decyl | Isopropenylphenyl |
| Vinyl | Cinnamyl |
| Allyl | Naphthyl |
| Ethynyl | |
| Propargyl | |
| Phenyl | |
| Tolyl | |
| Xylyl | |

—$C_6H_3(C_2H_5)_2$
—$C_6H_4(CH_2)_{11}CH_3$

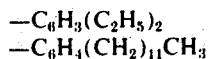

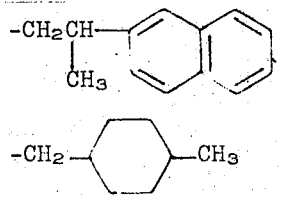

Many obvious variations of these radicals will be apparent to those skilled in the art and are included within the scope of the invention.

Substituted hydrocarbon, alkyl, aryl, etc., radicals are considered fully equivalent to the hydrocarbon, alkyl, aryl, etc., radicals and to be part of this invention. By "substituted" is meant radicals containing substituents which do not alter significantly the character or reactivity of the radical. Examples are:

Halide (fluoride, chloride, bromide, iodide)
Ether (especially lower alkoxy)
Keto
Carboxy
Ester (especially lower carbalkoxy)
Aminoacyl (amide)
Nitro
Cyano
Thioether
Sulfoxy
Sulfone In general, no more than about three such substituent groups will be present for each 10 carbon atoms in the radical.

Usually the hydrocarbon or substituted hydrocarbon radicals in reagent B are free from ethylenic and acetylenic unsaturation and have no more than about 30 carbon atoms, desirably no more than about 12 carbon atoms. They are preferably lower (as defined hereinabove) hydrocarbon radicals. A particular preference is expressed for lower alkyl or aryl radicals, especially alkyl.

For preparation of the especially preferred compositions for use as reagent B, from one to three and preferably all five of the $R^9$ radicals in the N-3-oxohydrocarbon-substituted acrylamide reagent are hydrogen; $R^6$ and $R^7$ are lower alkyl radicals; and $R^8$ is hydrogen or methyl. Suitable N-3-oxohydrocarbon-substituted acrylamides are disclosed in U.S. Pat. Nos. 3,277,056 and 3,425,942, the disclosures of which are hereby incorporated by reference in this specification; examples are N-(1,1-dimethyl-3-oxobutyl)-acrylamide, hereinafter referred to as diacetone acrylamide, and N-(1,3-diphenyl-1-methyl-3-oxopropyl)acrylamide, hereinafter referred to as diacetophenone acrylamide. Because diacetone acrylamide is preferred and is most readily available, it will frequently be referred to in this specification. However, it is to be understood that other N-3-oxohydrocarbon-substituted acrylamides may be substituted for diacetone acrylamide.

Aldehydes which may be reacted with diacetone acrylamide to form the water-soluble compositions useful as reagent B include formaldehyde, acetaldehyde, propionaldehyde and the butyraldehydes. Of these, formaldehyde is preferred. Reversible polymers of the aldehydes (e.g., paraformaldehyde, trioxane, paraldehyde) may be used in place of the monomeric aldehydes and are considered equivalents thereof.

Alkaline reagents suitable for use include sodium hydroxide, potassium hydroxide, alkaline earth metal hydroxides, sodium methoxide, quaternary ammonium hydroxides and the like. The proportion of alkaline reagent should, in general, not exceed about 5 mole percent of the aldehyde used and usually need not be greater than about 1.5 mole percent thereof. While larger amounts may sometimes be employed, the use of such larger amounts is unnecessary and requires very close control of the reaction (e.g., through use of an alcohol solvent or cautious incremental addition of the alkaline reagent, as described hereinafter) to avoid formation of a water-insoluble polymeric product as discussed hereinafter.

The reaction temperature is not critical, so long as it is not high enough to cause decomposition of the reactants or product or condensation to a water-insoluble product. Temperatures below about 100°C., preferably about 40°-90°C., are preferred. Likewise, the molar ratio of aldehyde to diacetone acrylamide is not critical. This ratio is usually between about 1:1 and 8:1, preferably between 1:1 and 4:1. In some instances the presence of a polymerization inhibitor such as hydroquinone, hydroquinone monomethyl ether or a hindered phenol may be beneficial.

As previously mentioned, the reaction to produce reagent B is carried out in a diluent comprising (1) water, or (2) an organic liquid which is a solvent for the reactants or the product or both, or (3) a mixture of diluents 1 and 2. Suitable organic diluents include alcohols, especially lower alkanols such as methanol, ethanol, n-butanol, isobutanol and the like; ethers and ether alcohols such as di-n-butyl ether, ethylene glycol monoethyl ether, ethylene glycol dimethyl ether, diethylene glycol monomethyl ether, dioxane and the like; and aromatic hydrocarbons such as benzene, toluene and xylene. The lower alkanols are particularly preferred by reason of the fact that they serve as solvents for both the reactants and the products. The same is true of water, and in the particularly preferred methods for preparation of reagent B, water alone is the diluent.

The water-soluble compositions useful as reagent B are not simple chemical compounds, and they can be completely defined only in terms of the method for their preparation. However, a fair amount of information about the structure of these compositions has been obtained by various analytical procedures including elemental analysis, infrared and nuclear magnetic resonance spectroscopy, and gel permeation chromatography. These procedures, when applied to the condensation product of diacetone acrylamide with formaldehyde or paraformaldehyde, show that the principal constituents of the compositions useful as reagent B are first, hydroxyalkyl compounds of the formula

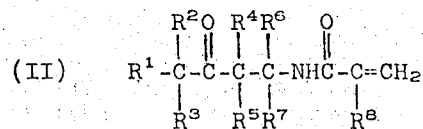

wherein each of $R^1$, $R^2$, $R^3$, $R^4$ and $R^5$ is hydrogen, a hydrocarbon or substituted hydrocarbon radical, or a hydroxyalkyl radical having not more than 4 carbon atoms, at least one and preferably from one to four of said radicals being hydroxyalkyl radicals and the remainder thereof preferably being hydrogen, and $R^6$, $R^7$ and $R^8$ are as previously defined, these hydroxyalkyl compounds being the predominant chemical species; second, when an alcohol is used as a diluent, analogous compounds containing alkoxyalkyl (preferably lower alkoxyalkyl) radicals in place of one or more (usually one or two) of said hydroxyalkyl radicals; and third, water-soluble condensation dimers and trimers of said compounds, which are apparently formed by condensation of the hydroxyalkyl and alkoxyalkyl compounds of formula II through ether or methylene linkages.

In general, the water-soluble compositions useful as reagent B consist essentially of the above-described compounds; that is, said compounds are the only ones present which materially affect or contribute to the novel properties of reagent B. Said reagent may also sometimes contain small amounts of higher condensation oligomers.

It is usually found that the compositions useful as reagent B also contain measurable amounts of diacetone acrylamide (or other compounds of formula I used as reactants), since it is difficult to force the hydroxyalkylation reaction to completion. The diacetone acrylamide may be present in amounts up to about 50 percent by weight of the water-soluble composition, but it generally comprises less than about 20 percent by weight thereof. The presence of diacetone acrylamide in reagent B is not detrimental to its properties, but at the same time it does not appear to be beneficial since diacetone acrylamide merely functions as a diluent. Therefore, the percentage thereof is preferably kept as low as possible.

Likewise, the presence of alkoxy derivatives and condensation dimers and trimers, especially the latter, is not harmful and may, in fact, be beneficial. However, if the reaction between diacetone acrylamide and the aldehyde is allowed to proceed too fast (especially in the presence of relatively large amounts of alkaline reagent, as mentioned hereinabove), condensation of the hydroxyalkyl compounds may get out of control and the product may contain substantial or major proportions of a water-insoluble thermosetting resin of the type disclosed and claimed in U.S. Pat. No. 3,518,326 and U.s. Reissue Pat. No. 27,328.

There are a number of ways to control the reaction so as to avoid formation of the water-insoluble resin. One is through the use of an alcohol as solent; apparently under such conditions the formation of alkoxyalkyl derivatives is favored and such derivatives undergo condensation less easily than the hydroxyalkyl compounds. A second is through incremental addition of the alkaline reagent over a prolonged period. When such incremental addition is employed, the pH of the mixture rises to about 10-11 after the addition of an increment of alkali but then gradually drops to about 7–8. It is believed that this is caused by a Cannizzaro-type reaction between excess alkali and excess formaldehyde to produce an alkali metal formate.

The method described above produces a solution or suspension of reagent B in water or an organic diluent, usually a solution in water or an alcohol. It is possible to isolate the reagent by removal of the diluent, which should be done cautiously and at relatively low temperatures (e.g., by vacuum evaporation or spray drying) to avoid condensation to a water-insoluble product as previously described. In the same way, the reagent may be concentrated by removal of a portion of the diluent, or a higher-boiling diluent may be added and the lower-boiling one removed by evaporation.

The preparation of water-soluble compositions useful as reagent B is illustrated by the following examples. All parts and percentages are by weight unless otherwise indicated.

EXAMPLE 1

A solution of 338 parts (2 moles) of diacetone acrylamide in 100 parts of water is heated to 50°C. and 45 parts of a 3 percent aqueous solution of trisodium phosphate is added. Dropwise addition of a 37 percent aqueous solution of formaldehyde is then begun and is continued for one hour, a total of 650 grams (8 moles of formaldehyde) being added. During the formaldehyde addition, three further portions of trisodium phosphate solution, one of 14 parts and two of 15 parts, are added. Heating is continued for 5 hours after formaldehyde addition is complete, and during that time additional increments of trisodium phosphate solution are added, care being taken that the pH of the mixture never increases above 10, until a total of 299 parts have been introduced (0.16 mole, or 2.0 mole percent based on formaldehyde).

The solution is cooled and filtered, and volatile materials are removed by heating under vacuum at 55°C. The product is a 61 percent aqueous solution of the desired water-soluble composition.

EXAMPLE 2

Following the procedure of Example 1, a similar reaction product is prepared from diacetone acrylamide and acetaldehyde.

EXAMPLE 3

Following the procedure of Example 1, a similar reaction product is prepared from diacetone acrylamide and n-butyraldehyde.

EXAMPLE 4

A solution of 280 parts (1.66 moles) of diacetone acrylamide in 296 parts of distilled water is heated to 33°C., and 164 parts of paraformaldehyde (5 moles based on monomeric formaldehyde) is added over 20 minutes. The solution is then heated to 47°C. and 8.3 parts of a 10 percent aqueous solution of potassium hydroxide is added over 10 minutes. The reaction mixture is stirred and heated to 52°C. over about ½ hour, at which time an exothermic reaction begins; stirring is continued and the temperature is kept at about 50°C. by passing cooling water through a jacket on the reaction vessel. At the end of the 2-hour stirring period, an additional 8.3 parts of the potassium hydroxide solution is added, and a final 8.3 parts is added after a further 2-hour stirring period (total 0.9 mole percent based on formaldehyde). The mixture is stirred for an additional 2 hours, cooled to 24°C. and filtered. The product, a 55 percent aqueous solution of the desired water-soluble composition, contains 3.04 percent nitrogen.

EXAMPLE 5

To a solution of 644 parts (3.81 moles) of diacetone acrylamide in 681 parts of water, at 31°C., is added, with stirring, 372 parts of paraformaldehyde (11.3 moles based on monomeric formaldehyde). The mixture is heated to 43°C. and 19 parts of a 10 percent aqueous solution of potassium hydroxide is added. The mixture is further heated, with stirring, to 48°–55°C. and maintained at this temperature for two hours. An additional 19 parts of potassium hydroxide solution is then added and stirring is continued for 2 hours, followed by addition of a third 19-ml. portion of potassium hydroxide solution (total 0.87 mole percent based on formaldehyde) and stirring for 2 more hours. The solution is then cooled to 29°C., 0.044 part of methylhydroquinone is added and the mixture is filtered. The product, a 53 percent aqueous solution of the desired water-soluble composition, contains 3.04 percent nitrogen.

EXAMPLE 6

A portion of the product of Example 5 (1,500 parts) is heated at 50°–55°C./70 torr for 8½ hours, during which time 469 parts of water is removed by distillation. The product is an 80 percent aqueous solution of the desired water-soluble composition.

EXAMPLE 7

A mixture of 400 parts of the product of Example 5 and 220 parts of ethylene glycol monomethyl ether is heated at 58°–72°C./102 torr until 309 parts of volatile material has been removed by distillation. The residue is an approximately 71 percent solution of the desired water-soluble composition in ethylene glycol monomethyl ether.

EXAMPLE 8

A mixture of 1,352 parts (8 moles) of diacetone acrylamide, 1,136 parts of methanol and 480 parts of a solution comprising 55 percent formaldehyde (8.8 moles of formaldehyde), 35 percent methanol and 10 percent water is heated to 44°C., and 10 parts of a 10 percent solution of potassium hydroxide in methanol (0.2 mole percent of potassium hydroxide based on formaldehyde) is added. The mixture is heated at 44°–47°C. for 7 hours, with stirring, and is then stripped of volatile materials by distillation at 48°C./4 torr. The water-soluble product contains 7.08 percent nitrogen.

EXAMPLE 9

Following the procedure of Example 8, a water-soluble product containing 6.16 percent nitrogen is obtained from 1,014 parts (6 moles) of diacetone acrylamide, 1,706 parts of methanol, 491 parts (9.0 moles of formaldehyde) of formaldehyde-methanol-water solution, and 10 parts of methanolic potassium hydroxide (0.2 mole percent potassium hydroxide based on formaldehyde).

EXAMPLE 10

Following the procedure of Example 8, a water-soluble product containing 6.38 percent nitrogen is obtained from 1,014 parts (6 moles) of diacetone acrylamide, 1,767 parts of methanol, 654 parts (12 moles of formaldehyde of formaldehyde-methanol-water solution, and 10 parts of methanolic potassium hydroxide (0.15 mole percent potassium hydroxide based on formaldehyde).

EXAMPLE 11

A mixture of 1014 parts (6 moles) of diacetone acrylamide, 1,890 parts of methanol, 981 parts (18 moles of formaldehyde) of the formaldehyde-methanol-water solution of Example 8 and 10 parts of a 10 percent solution of potassium hydroxide in methanol is heated to 50°C., with stirring, for about 3 hours. An additional portion of 10 parts of methanolic potassium hydroxide is added and heating and stirring are continued for 4 hours. A third portion of methanolic potassium hydroxide is then added (total 0.3 mole percent potassium hydroxide based on formaldehyde). Heating and stirring are continued for 4 hours, and then the solution is cooled and stripped of volatile materials by vacuum distillation as in Example 8. The water-soluble product contains 5.65 percent nitrogen.

EXAMPLE 12

A water-soluble product prepared by the method of Example 11 is freed of potassium ions by contact with a cation exchange resin. The resulting solution is stripped of volatile materials by vacuum distillation to obtain a 90 percent solution of the desired product.

EXAMPLE 13

The procedure of Example 11 is repeated except that the diacetone acrylamide is replaced, on an equimolar basis, by diacetophenone acrylamide. A similar product is obtained.

EXAMPLE 14

Following the procedure of Example 11, a product is prepared from 2,028 parts (12 moles) of diacetone acrylamide, 3,482 parts of methanol, 1,964 parts (36 moles of formaldehyde) of the formaldehyde-methanol-water solution, and 360 parts of methanolic potassium hydroxide. The product is neutralized with phosphoric acid to a pH of 6.45 and stripped of volatile materials under vacuum. The neutralized and stripped water-soluble product contains 5.03 percent nitrogen.

EXAMPLE 15

A mixture of 1,268 parts (7.5 moles) of diacetone acrylamide, 1,635 parts (30 moles of formaldehyde) of the formaldehyde-methanol-water solution of Example 8, and 15.8 parts of a 10 percent solution of potassium hydroxide in methanol (0.09 mole percent potassium hydroxide based on formaldehyde) is heated at 40°-50°C. for 5 hours, after which time volatile materials are removed by vacuum distillation. The water-soluble product contains 5.33 percent nitrogen.

EXAMPLE 16

Following the procedure of Example 4, a water-soluble product is prepared from a mixture having a 1:5 mole ratio of diacetone acrylamide to formaldehyde. The resulting product is stripped of volatile materials by distillation at 50°-55°C./60 torr to obtain a concentrated product containing only 20 percent water.

The method of this invention may be carried out by merely mixing reagents A and B and allowing them to react, ordinarily at a temperature of about 25°-100°C. and usually at 25°-80°C. The reaction may be effected in a suitable solvent such as water or an alcohol, ketone, ether alcohol or the like, but frequently no solvent is necessary. It is also often advantageous to carry out the reaction in the presence of an alkaline reagent, normally an inorganic base such as sodium or potassium hydroxide. The amount of alkaline reagent employed is not critical but is generally about 0.1-0.2 mole per mole of reagent B. The molar ratio of reagent A to reagent B is generally between about 5:1 and 1:1, preferably from about 2:1 to about 1:1.

Following the reaction, the product mixture sometimes separates into two layers of which the top layer generally constitutes the desired product, although occasionally some of the product may be present in both layers in which event it is advantageous to remove volatiles from both phases and recover them. The products are generally liquids and may be purified by ordinary techniques, although purification is frequently unnecessary for the purposes of the invention.

The molecular structures of the compositions of this invention are not known. It will be apparent that there are three possible groups in reagent B with which reagent A can react: the hydroxy groups, the keto group, and the olefinic group. Probably, all three react in varying proportions. Therefore, the compositions of this invention can accurately be described only in terms of the method for their preparation.

The method of this invention is illustrated by the following examples.

EXAMPLE 17 n-Butylamine, 146 parts (2 moles), is added with stirring to a mixture of 239 parts (0.48 mole) of the product of Example 4 and 30 parts of water. An exothermic reaction occurs which causes the temperature to rise to 45°C. The mixture is heated to 50°C. and 3.5 parts of 50 percent aqueous sodium hydroxide is added. The mixture is stirred for 2 hours and an additional 3.5 parts of sodium hydroxide is added; a third portion of 3.4 parts is added after an additional 2 hours. The mixture is stirred for 2 hours at 48°-51°C. and is then cooled, whereupon it separates into two layers. The top layer is removed and evaporated in vacuum, yielding the desired product which contains 13.2 percent nitrogen.

EXAMPLE 18

The procedure of Example 17 is repeated except that 498 parts (1 mole) of the product of Example 4 is used. The homogeneous mixture is stripped under vacuum to yield the desired product which contains 10.97 percent nitrogen.

EXAMPLE 19

Following the procedure of Example 17, a product is prepared from 498 parts (1 mole) of the product of Example 4 and 400 parts (2 moles) of $C_{11-14}$ tertiary alkyl primary amine mixture.

EXAMPLE 20

Following the procedure of Example 17, a product is prepared from 498 parts (1 mole) of the product of Example 4 and 258 parts (2 moles) of di-n-butylamine. The reaction temperature is 48°-60°C. Two layers form and the upper layer is removed and stripped under vacuum to yield the desired product which contains 8.78 percent nitrogen.

EXAMPLE 21

Following the procedure of Example 17, a product is prepared from 1 mole of the product of Example 4 and 2 moles of aniline.

EXAMPLE 22

Following the procedure of Example 17, a product is prepared from 1 mole of the product of Example 2 and 2 moles of morpholine.

EXAMPLE 23

A product is prepared by the method of Example 11 and after preparation is passed through a cation exchange resin and stripped of volatile materials to a nonvolatile content of 84 percent by weight. Diethylene triamine, 206 parts (2 moles), is heated to 50°C. under nitrogen, with stirring, and 720 parts (2 moles) of the above-described product is added over one-half hour. The mixture is stirred for 1 hour at 50°–55°C. and volatiles are then removed by vacuum evaporation and the concentrated product is filtered through cheesecloth. It contains 13.29 percent nitrogen.

EXAMPLE 24

A mixture of 50 parts (0.106 mole) of the product of Example 5 and 22 parts (0.212 mole) of diethylene triamine is heated at 62°–80°C. for 4 hours to yield the desired product.

The compositions of this invention serve as curing agents for polyepoxides. The reaction sequence by which curing is effected varies according to whether the composition of this invention contains primary, secondary, or tertiary (including Schiff's base) amine groups. When the amine groups are primary, it is believed that the amine itself is incorporated into the molecule through a cross-linking reaction by which two terminal epoxy groups react with the amine as follows.

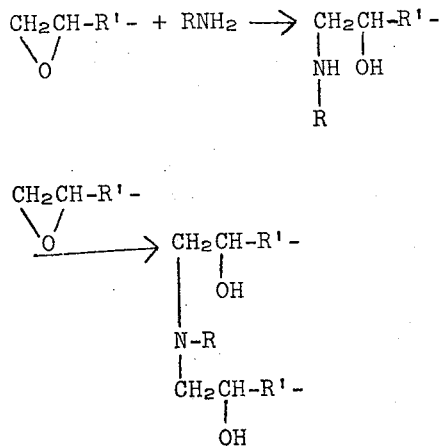

The same type of reaction may be entered into when the curing agent contains two amine groups, either or both of which are secondary; a crosslinking species may then comprise the two amine groups with the linking radical rather than a single amine group.

When the curing agent is a tertiary amine, the mechanism of the curing reaction is believed to involve salt formation with a epoxy group, which then in turn reacts with a second epoxy group to form a direct oxygen bridge between the two. Reaction may then proceed to form a grid-like structure, as indicated in the following reaction scheme.

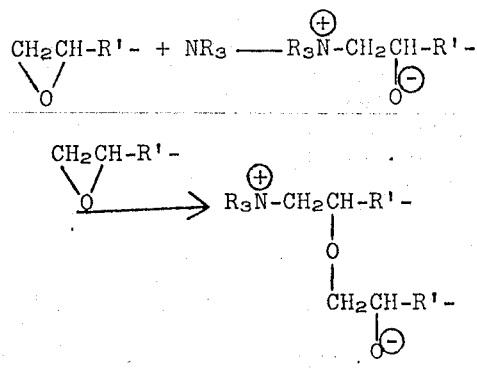

While most primary and secondary amines function as curing agents at room temperature, heat may be required in certain instances, especially with tertiary amines, to initiate the curing process. From a physical standpoint, the result is substantially the same — formation of an infusible, crosslinked resin — regardless of which kind of curing agent is used.

The polyepoxides which may be cured with the compositions of this invention include those compounds having more than one vic-epoxy group. These polyepoxides may be saturated or unsaturated, aliphatic, cycloaliphatic, aromatic or heterocyclic and may be substituted if desired with non-interfering substituents, such as halogen atoms, hydroxyl groups, ether radicals and the like. They may also be monomeric or polymeric. The following are illustrative of suitable polyepoxides.

I. Monomeric polyepoxides

1. Polyepoxy hydrocarbons such as butadiene dioxide, epoxidized 2,2-bis(2-cyclohexenyl)propane, epoxidized vinylcyclohexene, epoxidized dicyclopentadiene, 1,2,5,6-diepoxy-3-hexyne, and 1,2,5,6-diepoxyhexane.

2. Epoxy ethers such as 1,4-bis(2,3-epoxypropoxy)benzene, 1,3-bis(2,3-epoxypropoxy)benzene, 4,4'-bis(2,3-epoxypropoxy)diphenyl ether, 1,8-bis(2,3-epoxypropoxy)octane, 1,4-bis(2,3-epoxypropoxy)cyclohexane, 4,4'-bis(2-hydroxy-3,4-epoxybutoxy)diphenyldimethylmethane, 1,3-bis(4,5-epoxypentoxy)-5-chlorobenzene, 1,4-bis(3,4-epoxybutoxy)-2-chlorocyclohexane, diglycidyl ether, 1,3-bis(2-hydroxy-3,4-epoxybutoxy)benzene, 1,4-bis(2-hydroxy-4,5-epoxypentoxy)benzene, and 1,2,3,4-tetra(2-hydroxy-3,4-epoxybutoxy)butane.

3. Epoxidized esters of polyethylenically unsaturated monocarboxylic acids, such as epoxidized linseed, soybean, perilla, oiticica, tung, walnut and dehydrated castor oil, methyl linoleate, butyl linoleate, ethyl 9,12-octadecadienoate, butyl 9,12,15-octadecatrienoate, butyl eleostearate, monoglycerides of tung oil, fatty acids, monoglycerides of soybean, sunflower, rapeseed, hempseed, sardine and cottonseed oil.

4. Epoxidized esters of unsaturated monohydric alcohols and polycarboxylic acids, such as di-(2,3- epoxybutyl) adipate, di-(2,3-epoxybutyl) oxalate, di-(2,3-epoxyhexyl) succinate, di-(3,4-epoxybutyl)maleate, di-(2,3-epoxyoctyl)pimelate, di-(2,3-epoxybutyl)phthalate, di(2,3-epoxyoctyl) tetrahydrophthalate, di-(4,5-epoxydodecyl)maleate, di-(2,3-epoxybutyl)terephthalate, di-(2,3-epoxypentyl)thiodipropionate, di-(5,6-epoxytetradecyl) diphenyldicarboxylate, di-(3,4-epoxyheptyl)sulfonyldibutyrate, tri-(2,3-epoxybutyl) 1,2,4-butanetricarboxylate, di-(5,6-epoxypentadecyl) tartrate, di-(4,5-epoxytetradecyl) maleate, di-(2,3-epoxybutyl) azelate, di-(3,4-epoxybutyl) citrate, di-(5,6-epoxyoctyl) cyclohexane-1,3-dicarboxylate, and di-(4,5-epoxyoctadecyl) malonate.

5. Epoxidized esters of unsaturated alcohols and unsaturated carboxylic acids, such as 2,3-epoxybutyl 3,4-epoxypentenoate, 3,4-epoxyhexyl 3,4-epoxypentenoate, 3,4-epoxycyclohexyl 3,4-epoxycyclohexanoate, 3,4-epoxycyclohexyl 4,5-epoxyoctanoate, and 2,3-epoxycyclohexylmethyl epoxycyclohexanecarboxylate.

6. Epoxidized derivatives of polyethylenically unsaturated polycarboxylic acids such as dimethyl 8,9,12,13-diepoxyeicosanedioate, dibutyl 7,8,11,12-diepoxyoctadecanedioate, dioctyl 10,11-diethyl-8,9,12,13-diepoxyeicosanedioate, dihexyl 6,7,10,11-diepoxyhexadecanedioate, didecyl 9-epoxyethyl-10,11-epoxyoctadecenedioate, dibutyl 3-butyl-3,4,5,6-diepoxycyclohexane-1,2-dicarboxylate, dicyclohexyl 3,4,5,6-diepoxycyclohexane-1,2-dicarboxylate, dibenzyl 1,2,4,5-diepoxycyclohexane-1,2-dicarboxylate, and diethyl 5,6,10,11-diepoxyoctadecylsuccinate.

7. Glycidyl polyethers of the polyhdyric phenols, obtained by reacting a polyhydric phenol with a great excess of a halogen-containing epoxide in an alkaline medium. For example, bisphenol A[2,2-bis(4-hydroxyphenyl)propane] may be reacted with an excess of epichlorohydrin to form 2,2-bis-(2,3-epoxypropoxyphenyl)propane. Other polyhydric phenols that can be used for this purpose include resorcinol, catechol, hydroquinone, methyl resorcinol, 2,2-bis(4-hydroxyphenyl)butane, 4,4'-dihydroxybenzophenone, bis-(4-hydroxyphenyl)ethane, and 1,5-dihydroxynaphthalene. Other halogen-containing epoxides which may be used include 3-chloro-1,2-epoxybutane, 3-bromo-1,3-epoxyhexane, and 3-chloro-1,2-epoxyoctane.

II. Polymeric epoxides

8. Polyepoxypolyhydroxy polyethers obtained by reacting, preferably in an acidic or alkaline medium, a polyhydric alcohol or polyhydric phenol with a polyepoxide, such as the reaction product of glycerol and bis(2,3-epoxypropyl) ether, the reaction product of sorbitol and bis-(2,3-epoxy-2-methylpropyl) ether, the reaction product of pentaerythritol and 1,2,4,5-diepoxypentane, the reaction product of bisphenol A and bis(2,3-epoxy-2-methylpropyl) ether, the reaction product of resorcinol and bis-(2,3-epoxypropyl) ether, and the reaction product of catechol and bis-(2,3-epoxypropyl) ether.

9. Polyepoxy polyethers obtained by reacting, preferably in the presence of an acidic compound such as hydrofluoric acid, a halogen-containing epoxide with a polyhydric alcohol such as glycerol, propylene glycol, ethylene glycol, trimethylene glycol, butylene glycol and the like, and subsequently treating the resulting product with an alkaline reagent.

10. Epoxy derivatives of polyesters obtained by reacting an unsaturated polyhydric alcohol with an unsaturated polycarboxylic acid or anhydride, such as the polyester formed by reacting 8,9,12,13-eicosadienedioic acid with ethylene glycol, the polyester obtained by reacting diethylene glycol with 2-cyclohexene-1,4-dicarboxylic acid, and the like.

11. Epoxidized polymers and copolymers of diolefins, such as polybutadiene, butadiene-acrylonitrile copolymers, butadiene-styrene copolymers and the like.

12. Hydroxy-substituted polyepoxy polyethers obtained by reacting, preferably in an alkaline medium, a slight excess of a halogen-containing epoxide with any of the polyhydric phenols described above.

13. Glycidyl ethers of the novolac resins obtained by condensing an aldehyde with a phenol.

14. Polymers and copolymers of epoxy-containing monomers possessing at least one polymerizable ethylenic linkage. When this type of monomer is polymerized in the substantial absence of alkaline or acidic catalysts but in the presence of a free radical catalyst, actinic light or the like, they undergo addition polymerization at the ethylenic bond leaving the epoxy group unaffected. These monomers may be polymerized with themselves or with other ethylenically unsaturated monomers, such as styrene, vinyl acetate, acrylonitrile, methacrylonitrile, vinyl chloride, vinylidene chloride, methyl acrylate, methyl methacrylate, diallyl phthalate, vinyl allyl phthalate, divinyl adipate, chloroallyl acetate, and vinyl methallyl pimelate. Illustrative polymers include poly(allyl 2,3-epoxypropyl ether), poly(2,3-epoxypropylcrotonate), the copolymer of styrene with allyl 2,3-epoxypropyl ether, the copolymer of allyl benzoate with methallyl 3,4-epoxybutyl ether, poly-(vinyl 2,3-epoxypropyl ether), the copolymer of vinyl acetate with allyl glycidyl ether, and poly-(4-glycidyloxystyrene).

Particularly preferred for use as epoxy-containing compounds in the compositions of this invention are the so-called ethoxyline resins, which are obtained by condensing polyhydric phenols with epichlorohydrin.

In general, cured compositions are prepared by mixing approximately equal weights of the polyepoxide and the composition of this invention and allowing the same to react to form an infusible resin.

What is claimed is:

1. A method for the preparation of a composition of matter which comprises reacting (A) a primary or secondary amine with (B) a water-soluble composition prepared by reacting, in the presence of an alkaline reagent, an aliphatic aldehyde containing not more than about 4 carbon atoms, or a reversible polymer thereof, with a substituted acrylamide of the formula

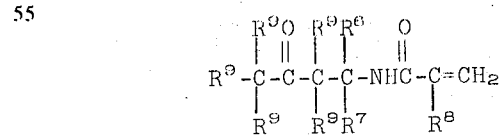

wherein each $R^9$ is individually hydrogen or a hydrocarbon radical, at least one such $R^9$ being hydrogen; each of $R^6$ and $R^7$ is hydrogen or a hydrocarbon radical; and $R^8$ is hydrogen or a lower alkyl radical; the reaction between said aldehyde and substituted acrylamide being effected in a diluent comprising (1) water, or (2) an organic liquid which is a solvent for the reactants or the product or both, or (3) a mixture of diluents 1 and 2.

2. A method according to claim 1 wherein the aldehyde is formaldehyde or a reversible polymer thereof, all of the R⁹ radicals are hydrogen atoms, R⁶ and R⁷ are lower alkyl radicals and R⁸ is hydrogen or methyl.

3. A method according to claim 2 wherein the substituted acrylamide is diacetone acrylamide and the diluent comprises water or a mixture of water with a lower alkanol.

4. A method according to claim 3 wherein the amine is a mono- or di(lower alkyl)amine or a polyalkylene polyamine.

5. A method according to claim 4 wherein the reaction between said reagents A and B is carried out in the presence of an inorgnic base.

6. A method according to claim 5 wherein the amine is a mono- or di-(lower alkyl)amine.

7. A method according to claim 4 wherein the amine is a polyethylene polyamine.

8. A method for the preparation of a composition of matter which comprises reacting (A) a primary or secondary amine with (B) a water-soluble composition consisting essentially of:

compounds of the formula

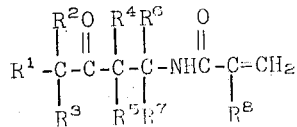

wherein each of R¹, R², R³, R⁴ and R⁵ is hydrogen, a hydrocarbon radical, a hydroxyalkyl radical having not more than 4 carbon atoms, or an alkoxy derivative of said hydroxyalkyl radical, at least one of R¹, R², R³, R⁴ and R⁵ being a hydroxyalkyl radical or alkoxy derivative thereof; each of R⁶ and R⁷ is hydrogen or a hydrocarbon radical; and R⁸ is hydrogen or a lower alkyl radical; and condensation dimers and trimers of said compounds.

9. A method according to claim 8 wherein from one to four of R¹, R², R³, R⁴ and R⁵ are hydroxymethyl radicals and the remainder thereof are hydrogen atoms, R⁶ and R⁷ are lower alkyl radicals and Rhu 8 is hydrogen or methyl.

10. A method according to claim 9 wherein R⁶ and R⁷ are methyl radicals and R⁸ is hydrogen.

11. A method according to claim 10 wherein the amine is a mono- or di-(lower alkyl)amine or a polyalkylene polyamine.

12. A method according to claim 11 wherein reagent B additionally contains, as a diluent, up to 20 percent of diacetone acrylamide.

13. A method according to claim 12 wherein the reaction between said reagents A and B is carried out in the presence of an inorganic base.

14. A method according to claim 13 wherein the amine is a mono- or di-(lower alkyl)amine.

15. A method according to claim 12 wherein the amine is a polyethylene polyamine.

16. A composition prepared by the method of claim 1.

17. A composition prepared by the method of claim 2.

18. A composition prepared by the method of claim 3.

19. A composition prepared by the method of claim 5.

20. A composition prepared by the method of claim 6.

21. A composition prepared by the method of claim 7.

22. A composition prepared by the method of claim 8.

23. A composition prepared by the method of claim 9.

24. A composition prepared by the method of claim 10.

25. A composition prepared by the method of claim 13.

26. A composition prepared by the method of claim 14.

27. A composition prepared by the method of claim 15.

* * * * *

UNITED STATES PATENT OFFICE
CERTIFICATE OF CORRECTION

PATENT NO. : 3,864,311
DATED : February 4, 1975
INVENTOR(S) : Richard William Jahnke It is certified that error appears in the above–identified patent and that said Letters Patent are hereby corrected as shown below:

Column 1, line 10, "and" should read --or--; line 18, "a" should be cancelled; line 22, the comma after "ethylene" should be cancelled. Column 3, line 66, a colon should appear after "are". Column 4, line 19, a comma should appear after "third". Column 7, line 4, parentheses should be closed after "formaldehyde" (first occurrence). Column 8, line 6, "solent" should read --solvent--. Column 12, line 30, the comma after "pimelate" should be replaced by a period. Column 13, line 15, "inorgnic" should read --inorganic--. Column 14, line 1, "Rhu 8" should read --$R^8$--.

Signed and Sealed this twenty-ninth Day of July 1975

[SEAL]

Attest:

RUTH C. MASON
Attesting Officer

C. MARSHALL DANN
Commissioner of Patents and Trademarks